United States Patent
Schütz et al.

(10) Patent No.: US 11,548,467 B2
(45) Date of Patent: Jan. 10, 2023

(54) AIRBAG FOR RESTRAINING A VEHICLE OCCUPANT, METHOD FOR THE PRODUCTION THEREOF, AND AIRBAG MODULE COMPRISING SUCH AN AIRBAG

(71) Applicant: ZF AUTOMOTIVE SAFETY GERMANY GMBH, Aschaffenburg (DE)

(72) Inventors: Dominik Schütz, Heimbuchenthal (DE); Ohnishi Nobuyuki, Kanagawa prefecture (JP)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 4 days.

(21) Appl. No.: 17/056,776

(22) PCT Filed: May 28, 2019

(86) PCT No.: PCT/EP2019/063740
§ 371 (c)(1),
(2) Date: Nov. 19, 2020

(87) PCT Pub. No.: WO2019/238407
PCT Pub. Date: Dec. 19, 2019

(65) Prior Publication Data
US 2021/0206336 A1    Jul. 8, 2021

(30) Foreign Application Priority Data
Jun. 11, 2018   (DE) .................... 10 2018 113 881.4

(51) Int. Cl.
B60R 21/231    (2011.01)
B60R 21/2338   (2011.01)
B60R 21/00     (2006.01)

(52) U.S. Cl.
CPC ........ *B60R 21/231* (2013.01); *B60R 21/2338* (2013.01); *B60R 2021/0048* (2013.01);
(Continued)

(58) Field of Classification Search
CPC .............. B60R 21/231; B60R 21/2338; B60R 2021/0048; B60R 2021/23386; B60R 2021/23388; B60R 2021/0009
See application file for complete search history.

(56) References Cited

U.S. PATENT DOCUMENTS 5,253,892 A    10/1993  Satoh
6,086,092 A     7/2000  Hill
(Continued)

FOREIGN PATENT DOCUMENTS

JP    2002316613    10/2002
JP    2010241241    10/2010
JP     201193336     5/2011

*Primary Examiner* — James A English
*Assistant Examiner* — Joselynn Y Sliteris
(74) *Attorney, Agent, or Firm* — Tarolli, Sundheim, Covell & Tummino LLP

(57) ABSTRACT

The invention relates to an airbag (10) for restraining a vehicle occupant (12) in an automotive vehicle, comprising an inflatable cushion portion (20) for damping an occupant impact and two inflatable tube portions (22) laterally opposed in the mounted state of the airbag (10) which are arranged on the occupant side on the cushion portion (20), wherein the tube portions (22) are connected to each other by a slide layer (24) arranged on the occupant side on the cushion portion (20) and are laterally movable at least in portions relative to the cushion portion (20). Furthermore, the invention also relates to a method for manufacturing an airbag (10) as well as an airbag module (18) comprising said airbag (10).

19 Claims, 2 Drawing Sheets

US 11,548,467 B2

Page 2

(52) U.S. Cl.
CPC ............... *B60R 2021/23386* (2013.01); *B60R 2021/23388* (2013.01)

(56) References Cited

U.S. PATENT DOCUMENTS

| | | | | |
|---|---|---|---|---|
| 7,090,245 | B2* | 8/2006 | Yoshikawa | B60R 21/206 280/729 |
| 7,740,275 | B2* | 6/2010 | Kwon | B60R 21/231 280/743.1 |
| 7,926,840 | B1* | 4/2011 | Choi | B60R 21/214 280/730.1 |
| 8,622,417 | B1* | 1/2014 | Schneider | B60R 21/231 280/743.2 |
| 9,580,040 | B2* | 2/2017 | Komatsu | B60R 21/233 |
| 9,694,782 | B2* | 7/2017 | Nagatani | B60R 21/2338 |
| 9,738,243 | B2* | 8/2017 | Fukawatase | B60R 21/2338 |
| 10,293,775 | B2* | 5/2019 | Wang | B60R 21/205 |
| 10,486,637 | B2* | 11/2019 | Thomas | B60R 21/216 |
| 10,632,959 | B2* | 4/2020 | Jeong | B60R 21/2338 |
| 10,654,439 | B2* | 5/2020 | Kitagawa | B60R 21/237 |
| 11,192,513 | B2* | 12/2021 | Takeuchi | B60R 21/205 |
| 2002/0105171 | A1 | 8/2002 | Fellhauer et al. | |
| 2004/0145162 | A1 | 7/2004 | Abe et al. | |
| 2006/0197320 | A1 | 9/2006 | Abe | |
| 2018/0111581 | A1 | 4/2018 | Wang et al. | |
| 2018/0126945 | A1* | 5/2018 | Aranzulla | B60R 21/233 |
| 2019/0009745 | A1* | 1/2019 | Hikida | B60R 21/2346 |
| 2020/0122678 | A1* | 4/2020 | Tanaka | B60R 21/0132 |

* cited by examiner

AIRBAG FOR RESTRAINING A VEHICLE OCCUPANT, METHOD FOR THE PRODUCTION THEREOF, AND AIRBAG MODULE COMPRISING SUCH AN AIRBAG

RELATED APPLICATIONS

This application corresponds to PCT/EP2019/063740, filed May 28, 2019, which claims the benefit of German Application No. 10 2018 113 881.4, filed Jun. 11, 2018, the subject matter of which are incorporated herein by reference in their entirety.

BACKGROUND OF THE INVENTION

The invention relates to an airbag for restraining a vehicle occupant in an automotive vehicle, a method for manufacture thereof and an airbag module comprising said airbag.

For improving the occupant safety, already for some time airbag modules have been employed as restraint devices in vehicles. In the meantime, so-called front airbags have become especially wide-spread which in the case of crash deploy as an air cushion in front of the vehicle occupant and damp an impact of the occupant, in particular of the occupant's head.

In some cases, the vehicle occupant does not impact exactly frontally but diagonally on the airbag, which might possibly entail an inadvertently strong rotary motion of the head which is inconvenient for the occupant.

SUMMARY OF THE INVENTION

It is the object of the invention to provide an airbag that ensures a preferably optimum and convenient restraining effect as well as minimizes especially a rotary motion of the occupant's head even in the case of diagonal impact of the vehicle occupant.

According to the invention, this object is achieved by an airbag for restraining a vehicle occupant in an automotive vehicle, comprising an inflatable cushion portion for damping impact of an occupant and two inflatable tube portions laterally opposed in the mounted state of the airbag which are arranged on the occupant side on the cushion portion, wherein the tube portions are connected to each other by a slide layer arranged on the occupant side on the cushion portion and are laterally movable at least in portions relative to the cushion portion. Due to the low friction between the cushion portion and the slide layer and, resp., the tube portions, a lateral force component of the vehicle occupant during diagonal impact entails lateral sliding of the occupant's head including the slide layer and the tube positions on the cushion portion, said sliding counteracting rotation of the head. The inflatable lateral tube portions delimit the impact surface and moreover constitute a lateral support which equally counteracts rotation of the head. Consequently, a rotary motion of the occupant's head during diagonal impact is reduced to an acceptable extent by lateral sliding and/or backing of the head.

In one embodiment of the airbag, the tube portions are in fluid communication with the cushion portion. In this way, the tube portions can be straightforwardly filled with inflator gas via the cushion portion. An inflator provided for inflating the airbag therefore merely has to be dimensioned to be somewhat larger. A separate inflator serving exclusively for filling the tube portions thus is not necessary, which has an advantageous effect on the space required, the complexity and the costs of the airbag module.

Of preference, the slide layer is integrally transformed to at least one of the tube portions. This facilitates the airbag design and thus contributes to low manufacturing expenditure.

According to another embodiment of the airbag, each of the tube portions extends along a longitudinal tube axis from a first axial end where they are in fluid communication with the cushion portion to an opposite second axial end. Due to the linear geometry thereof, independently of the occupant's size the tube portions constitute a lateral support reliably preventing excessive rotation of the occupant's head.

In this embodiment, the tube portions may be tightly connected, especially stitched, to the cushion portion at the second axial end thereof. In the case of diagonal impact, this helps to restrict possible lateral movement of the occupant's head relative to the cushion portion with little effort.

Preferably, each tube portion is movable at least between the two axial ends thereof relative to the cushion portion in a direction transverse to the longitudinal tube axis so as to enable lateral motion of the occupant's head during diagonal impact. In the case of fluid communication, the inflatable tubular portions are connected to the cushion portion even at the first axial end thereof so that a lateral motion of the head is brought about by deformation of the tube portions between the two axial ends. Further, the load during diagonal impact may also entail deformation of the cushion portion in the area of the connection to the first and second axial ends of the tube portions, wherefrom equally a possible lateral motion of the head is resulting.

As an alternative to or in addition to the second axial ends of the tube portions, the slide layer may be tightly connected, especially stitched, to the cushion portion in the area between the second axial ends of the tube portions. In this way, too, during diagonal impact a possible lateral motion of the occupant's head relative to the cushion portion can be restricted with little effort.

According to another embodiment of the airbag, the slide layer includes at least one slit, preferably plural slits, the slits extending especially substantially in parallel to the longitudinal tube axis. The length and the number of the slits help to specifically adjust the coupling of the opposite tube portions. In this way, with a non-slotted slide layer only a joint lateral motion of the tube portions is possible, whereas with a strongly slotted slide layer a lateral motion of a tube portion is completely compensated, in the extreme case, by laterally extending the slit edges without any lateral motion of the opposite tube portion taking place. As a consequence, in this way a desired lateral slide resistance can be influenced with little effort.

Preferably, the cushion portion, the tube portions and the slide layer are formed of a maximum of two separate fabric cuts. This entails an especially simple structure of the airbag so that the latter can be manufactured at low cost.

The cushion portion preferably has an airbag orifice for filling the airbag with inflator gas.

Incidentally, the invention also relates to an airbag module comprising an inflator and an afore-described airbag, with the inflator being connected to the cushion portion of the airbag and the tube portions being adapted to be filled with inflator gas via the cushion portion. Hence, initially the cushion portion essential to damping the occupant impact is inflated. Only then, the tube portions are filled via the cushion portion so as to prevent excessive rotary motion of the occupant's head.

Finally, the invention also relates to a method for manufacturing an airbag, especially an afore-described airbag, the method comprising the following steps:

a) Two elongate, especially oval fabric layers are superimposed and are connected, especially stitched, to each other so that with an approximately central partition of the fabric layers transversely to the longitudinal direction thereof, on a first half of the fabric layers an inflatable cushion portion is formed and on a second half of the fabric layers two inflatable tube portions each being in fluid communication with the inflatable cushion portion as well as a slide layer located in the transverse direction between the two tube portions are formed;

b) the fabric layers are folded along a folding edge extending transversely to the longitudinal direction so that the tube portions and the slide layer come to rest on the cushion portion;

c) the tube portions and/or the slide layer are tightly connected, especially stitched, to the cushion portion of the airbag at a rim opposed to the folding edge.

The elongate fabric layers may be formed in one piece or may consist of two separate fabric cuts. In each case, the airbag comprises very few single parts and accordingly can be manufactured at low cost. The length of two elongate fabric layers preferably is about twice the width thereof so that after folding in step b) a geometric structure is resulting the length and width of which are approximately similar. Thus, the later deployment shape is comparable to conventional airbags, especially to substantially round driver front airbags.

BRIEF DESCRIPTION OF THE DRAWINGS

Further features and advantages of the invention will be evident from the following description of a preferred embodiment with reference to the drawings, wherein.

DESCRIPTION

Figure 1:
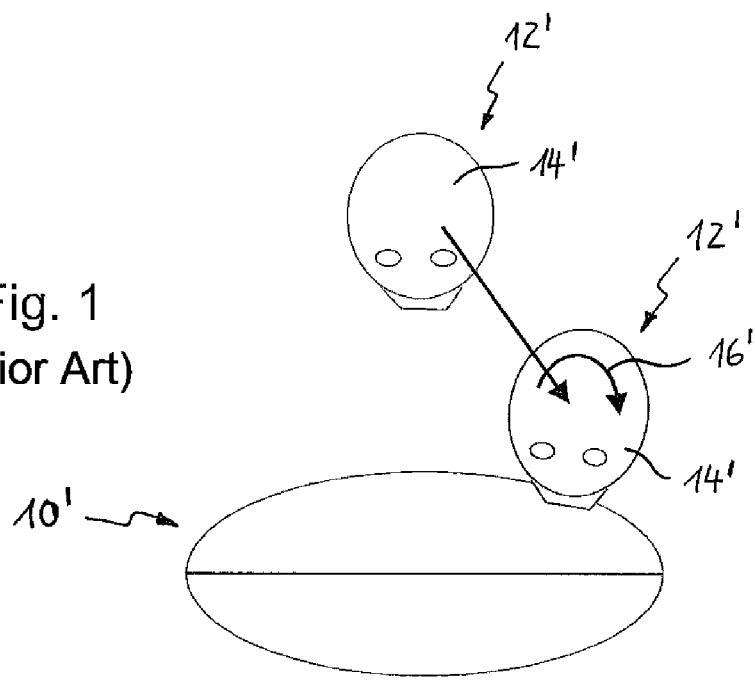
FIG. 1 shows a schematic sketch of an inflated conventional airbag in the case of diagonal impact of a vehicle occupant.

FIG. 1 illustrates a conventional airbag 10' in the case of diagonal impact of a vehicle occupant 12'. The head 14' of the vehicle occupant 12' is accelerated diagonally relative to a surface of the airbag 10' and impacts eccentrically on the airbag 10'. Due to the acceleration component in parallel to the airbag surface, rotation is imparted to the head 14' after impacting on the airbag 10', which is indicated by an arrow 16' in FIG. 1. A resulting rotation in the area of the cervical spine is inconvenient to the vehicle occupant 12' and therefore should be reduced to a minimum.

Figure 2:
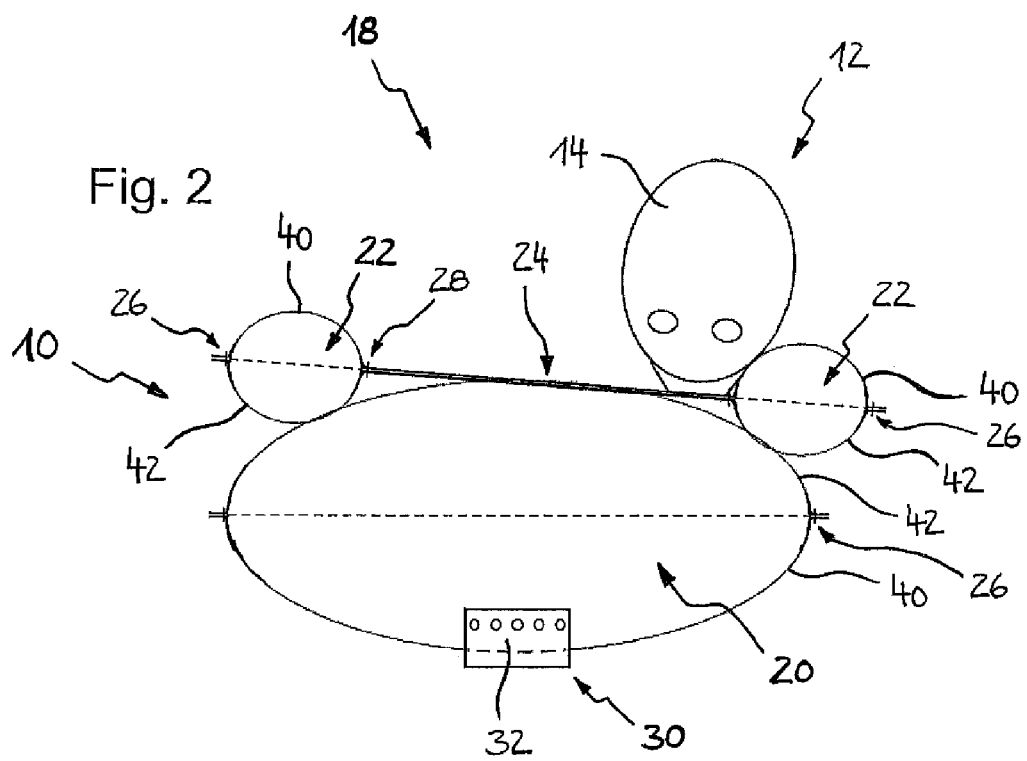
FIG. 2 shows a schematic sketch of an airbag module according to the invention comprising an inflated airbag according to the invention in the case of diagonal impact of a vehicle occupant.

On the other hand, FIG. 2 shows an airbag module 18 comprising an airbag 10 according to the invention during diagonal impact of the occupant 12.

Said airbag 10 for restraining the vehicle occupant 12 in a vehicle comprises an inflatable cushion portion 20 for damping an occupant impact, as it is known from conventional airbags, as well as furthermore two inflatable tube portions 22 laterally opposed in the mounted state of the airbag 10 which are arranged on the occupant side on the cushion portion 20, wherein the tube portions 22 are connected to each other by a slide layer 24 arranged on the occupant side on the cushion portion 20 and are laterally movable at least in portions relative to the cushion portion 20.

Consequently, during diagonal impact of the vehicle occupant 12 the head 14 of the latter may slide together with the slide layer 24 laterally on the cushion portion 20, thus causing the head rotation and consequently a rotary motion in the neck area of the occupant to be advantageously reduced. Furthermore, the head 14 may be laterally backed by either of the tube portions 22, which equally contributes to a reduced rotary motion of the head 14.

Figure 3:
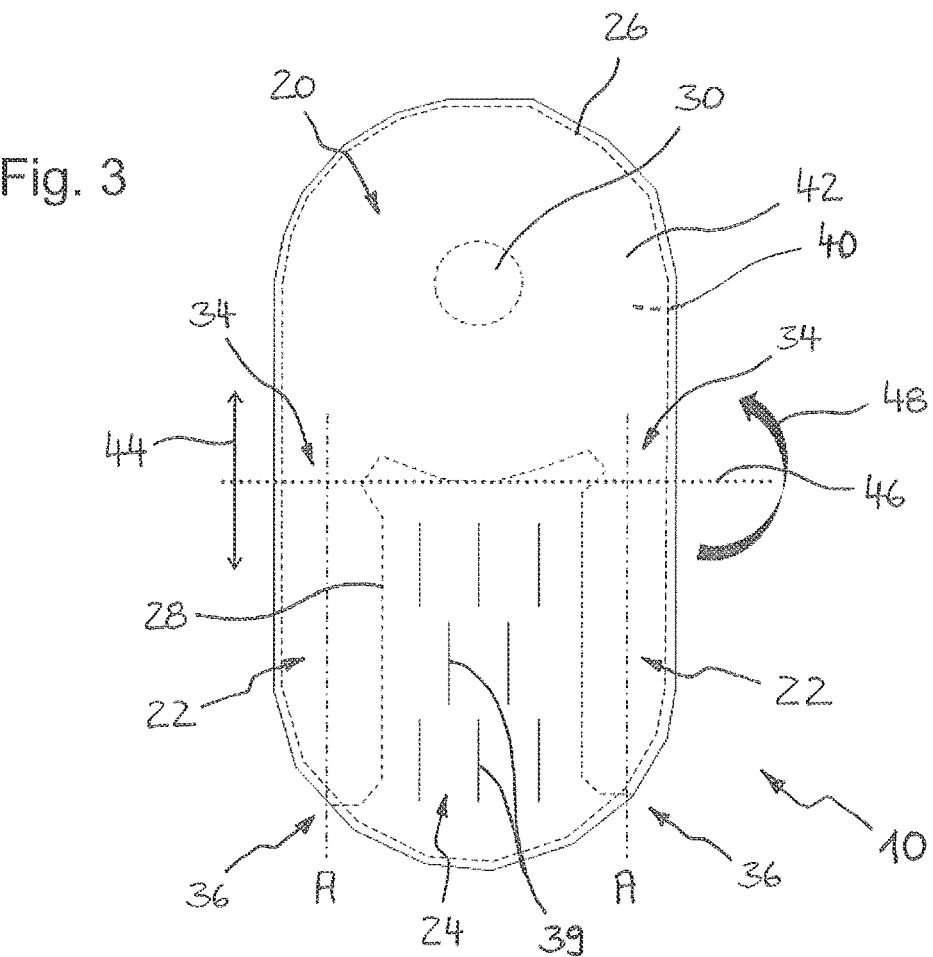
FIG. 3 shows a top view of the airbag according to FIG. 2 during manufacture thereof in an intermediate state.
Figure 4:
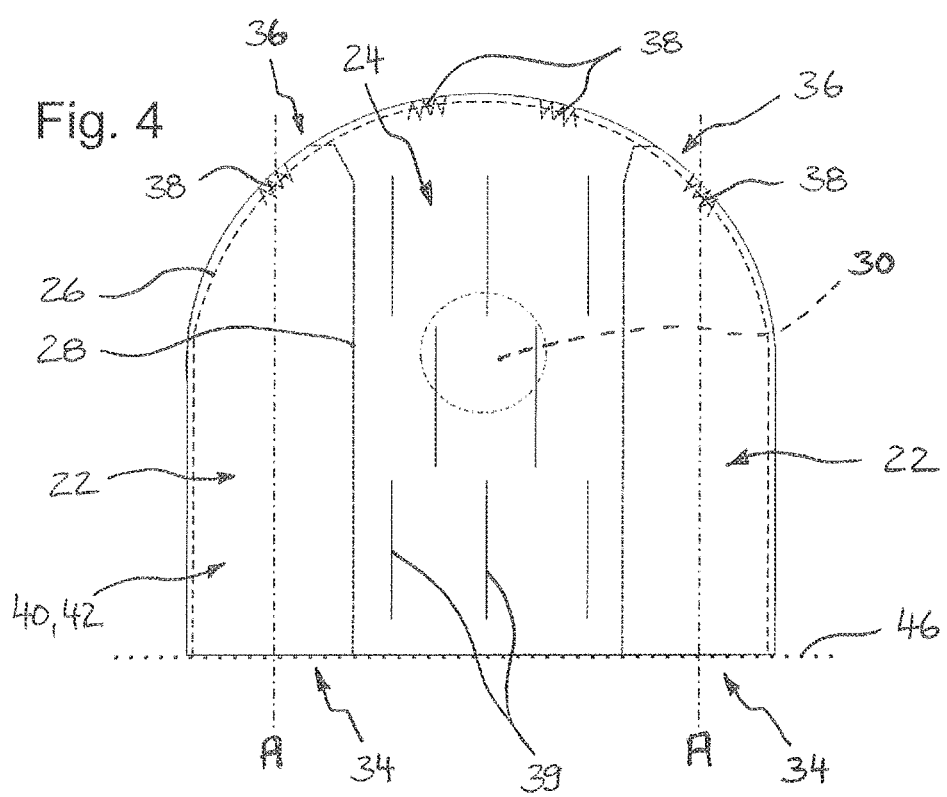
FIG. 4 shows a top view of the airbag according to FIG. 3 in a completed final state.

In each of the FIGS. 3 and 4, a top view of the deployed but not inflated airbag 10 is shown, with FIG. 3 illustrating the airbag 10 during manufacture thereof in an intermediate state and FIG. 4 illustrating the completed airbag 10 in a final state.

According to FIG. 3, the airbag 10 is formed of two separate elongate fabric cuts which are superimposed and are connected by a seam 26 circumferential on the edge side as well as a further seam 28 so as to define the cushion portion 20, the tube portions 22 and the slide layer 24.

The tube portions 22 are integrally transformed to the slide layer 24 and are in fluid communication with the cushion portion 20, the cushion portion 20 having an airbag orifice 30 for filling the airbag 10 with inflator gas.

As indicated in FIG. 2, the airbag module 18 also comprises, apart form the airbag 10, an inflator 32 connected to the airbag orifice 30 of the cushion portion 20 and, upon activation of the airbag module 18, fills the tube portions 22 via the cushion portion 20 with inflator gas.

Each of the tube portions 22 extends along a longitudinal tube axis A from a first axial end 34, where they are in fluid communication with the cushion portion 20, to an opposite second axial end 36.

In the finished state of the airbag 10 according to FIG. 4, the tube portions 22 are movable at least between the respective axial ends 34, 36 thereof relative to the cushion portion 20 in a direction transverse to the longitudinal tube axis A.

In order to restrict the lateral displacement of the tube portions 22 the cushion portion 20 is preferably tightly connected, especially stitched, to the second axial ends 36 of the tube portions 22 and/or with the slide layer 24 in the area between the second axial ends 36 of the tube portions 22.

In the embodiment according to FIG. 4, in the area of the edge-side seam 26 of the airbag 10 plural short seam portions 38 are indicated which connect both the second axial ends 36 of the tube portions 22 and the slide layer 24 between the second axial ends 36 to the cushion portion 20.

As illustrated in FIGS. 3 and 4, the slide layer 24 of the airbag 10 has plural slits 39 extending substantially in parallel to the longitudinal tube axis A. Via the length and the number of the slits 39 the coupling of the opposed tube portions 22 can be specifically influenced and, in this way, a desired lateral slide resistance can be adjusted with little effort.

Hereinafter the manufacture of the airbag 10 shall be briefly discussed.

In a step a) initially two elongate oval fabric layers 40, 42 are superimposed and stitched to each other so that, with an approximately central partition of the fabric layers 40, 42 transversely to the longitudinal direction 44 thereof, on a first half of the fabric layers 40, 42 the inflatable cushion portion 20 is formed and on a second half of the fabric layers 40, 42 the two inflatable tube portions 22 each being in fluid communication with the inflatable cushion portion 20 as well as the slide layer 24 arranged in the transverse direction between the two tube portions 22 are formed (see FIG. 3).

Here the fabric layers 40, 42 are formed of two separate identical fabric cuts, wherein alternatively also a one-piece design of the fabric layers 40, 42 is imaginable.

The slide layer 24 in this case is a "double layer" consisting of both fabric layers 40, 42. This is not absolutely necessary to the afore-described lateral sliding of the occupant's head 14 in the case of diagonal impact so that, as an alternative, either of the two fabric layers 40, 42 may be cut out in the area of the slide layer 24 and the slide layer 24 is correspondingly formed only by the other slide layer 40, 42. Accordingly, the drawback of different fabric cuts for the airbag 10 is in opposition to advantageous savings as to material, weight and space required.

In a subsequent step b) of the manufacturing process for the airbag 10, the fabric layers 40, 42 are folded along a folding edge 46 extending transversely to the longitudinal direction 44 so that the tube portions 22 and the slide layer 24 come to lie on the cushion portion 20.

This is indicated in FIG. 3 by an arrow 48 and is evident as a result in FIG. 4. The length and the width of the finished airbag 10 are preferably approximately equal so that originally the length of the elongate fabric layers 40, 42 is about twice the width.

Finally, the tube portions 22 and/or the slide layer 24 are tightly connected, especially stitched, to the cushion portion 20 of the airbag 10 at a rim opposite to the folding edge 46.

The afore-described airbag 10 in the present example embodiment is a driver-side front airbag, but by minor adaptations it can be easily used as front airbag on the passenger side as well. In any case, the airbag 10 entails an improved restraining effect which is more convenient for the vehicle occupant in the case of diagonal impact.

The invention claimed is:

1. An airbag for restraining a vehicle occupant (12) in an automotive vehicle, comprising:
   an inflatable cushion portion (20) for damping an occupant impact; and
   two inflatable tube portions (22) laterally opposed in an inflated state of the airbag (10) which are arranged on an occupant side on the cushion portion (20),
   wherein the tube portions (22) are connected to each other by a slide layer (24) arranged on the occupant side on the cushion portion (20) and are laterally movable at least in portions relative to the cushion portion (20), wherein the slide layer (24) is configured to slide on the cushion portion (20) in response to lateral movement of the tube portions (22), and wherein the slide layer (24) is configured to contact the cushion portion (20) in the inflated state of the airbag (10).

2. The airbag according to claim 1, wherein the tube portions (22) are in fluid communication with the cushion portion (20).

3. The airbag according to claim 1, wherein the slide layer (24) is integrally formed with at least one of the tube portions (22).

4. The airbag according to claim 1, wherein each of the tube portions (22) extends along a longitudinal tube axis (A) from a first axial end (34), where they are in fluid communication with the cushion portion (20), to an opposite second axial end (36).

5. The airbag according to claim 4, wherein the tube portions (22) are tightly connected to the cushion portion (20) at their second axial end (36).

6. The airbag according to claim 4, wherein each tube portion (22) is movable at least between both axial ends (34, 36) thereof relative to the cushion portion (20) in a direction transverse to the longitudinal tube axis (A).

7. The airbag according to claim 4, wherein the slide layer (24) is tightly connected to the cushion portion (20) in an area between the second axial ends (36) of the tube portions (22).

8. The airbag according to claim 4, wherein the tube portions (22) are stitched to the cushion portion (20) at their second axial end (36).

9. The airbag according to claim 4, wherein the slide layer (24) is stitched to the cushion portion (20) in an area between the second axial ends (36) of the tube portions (22).

10. The airbag according to claim 1, wherein the slide layer (24) has at least one slit (39).

11. The airbag according to claim 1, wherein the cushion portion (20), the tube portions (22) as well as the slide layer (24) are formed of a maximum of two separate fabric cuts.

12. The airbag according to claim 1, wherein the cushion portion (20) has an airbag orifice (30) for filling the airbag (10) with inflator gas.

13. An airbag module comprising an inflator (32) and an airbag (10) according to claim 1, wherein the inflator (32) is connected to the cushion portion (20) of the airbag (10) and the tube portions (22) can be filled with inflator gas via the cushion portion (20).

14. A method for manufacturing an airbag (10), according to claim 1, comprising the following steps:
    two elongate fabric layers (40, 42) are superimposed and connected to each other so that, with an approximately central partition of the fabric layers (40, 42) transversely to a longitudinal direction (44), on a first half of the fabric layers (40, 42) an inflatable cushion portion (20) is formed and on a second half of the fabric layers (40, 42) two inflatable tube portions (22) each being in fluid communication with the inflatable cushion portion (20) as well as a slide layer (24) located in transverse direction between the two tube portions (22) are formed;
    the fabric layers (40, 42) are folded along a folding edge (46) extending transversely to the longitudinal direction (44) so that the tube portions (22) and the slide layer (24) come to rest on the cushion portion (20);
    the tube portions (22) and/or the slide layer (24) are tightly connected to the cushion portion (20) of the airbag (10) at a rim opposed to the folding edge (46).

15. The airbag according to claim 14, wherein the two elongate fabric layers (40, 42) are oval shaped.

16. The airbag according to claim 1, wherein slide layer (24) is configured to slide along the cushion portion (20) in response to an occupant impacting the slide layer.

17. An airbag for restraining a vehicle occupant (12) in an automotive vehicle, comprising:
    an inflatable cushion portion (20) for damping an occupant impact; and
    two inflatable tube portions (22) laterally opposed in an inflated state of the airbag (10) which are arranged on an occupant side on the cushion portion (20),
    wherein the tube portions (22) are connected to each other by a slide layer (24) arranged on the occupant side on the cushion portion (20) and are laterally movable at least in portions relative to the cushion portion (20), and wherein the slide layer (24) has at least one slit (39).

18. An airbag for restraining a vehicle occupant (12) in an automotive vehicle, comprising:
    an inflatable cushion portion (20) for damping an occupant impact; and two inflatable tube portions (22) laterally opposed in an inflated state of the airbag (10) which are arranged on an occupant side on the cushion portion (20), wherein the tube portions (22) are connected to each other by a slide layer (24) arranged on the occupant side on the cushion portion (20) and are laterally movable at least in portions relative to the cushion portion (20), wherein the slide layer (24) is configured to slide on the cushion portion (20) in response to lateral movement of the tube portions (22), wherein each of the tube portions (22) extends along a longitudinal tube axis (A) from a first axial end (34), where they are in fluid communication with the cushion portion (20), to an opposite second axial end (36), and wherein the tube portions (22) are tightly connected to the cushion portion (20) at their second axial end (36).

19. An airbag for restraining a vehicle occupant (12) in an automotive vehicle, comprising:

an inflatable cushion portion (20) for damping an occupant impact; and two inflatable tube portions (22) laterally opposed in an inflated state of the airbag (10) which are arranged on an occupant side on the cushion portion (20), wherein the tube portions (22) are connected to each other by a slide layer (24) arranged on the occupant side on the cushion portion (20) and are laterally movable at least in portions relative to the cushion portion (20), wherein the slide layer (24) is configured to slide on the cushion portion (20) in response to lateral movement of the tube portions (22), wherein each of the tube portions (22) extends along a longitudinal tube axis (A) from a first axial end (34), where they are in fluid communication with the cushion portion (20), to an opposite second axial end (36), and wherein the slide layer (24) is tightly connected to the cushion portion (20) in an area between the second axial ends (36) of the tube portions (22).

* * * * *